Patented May 11, 1943

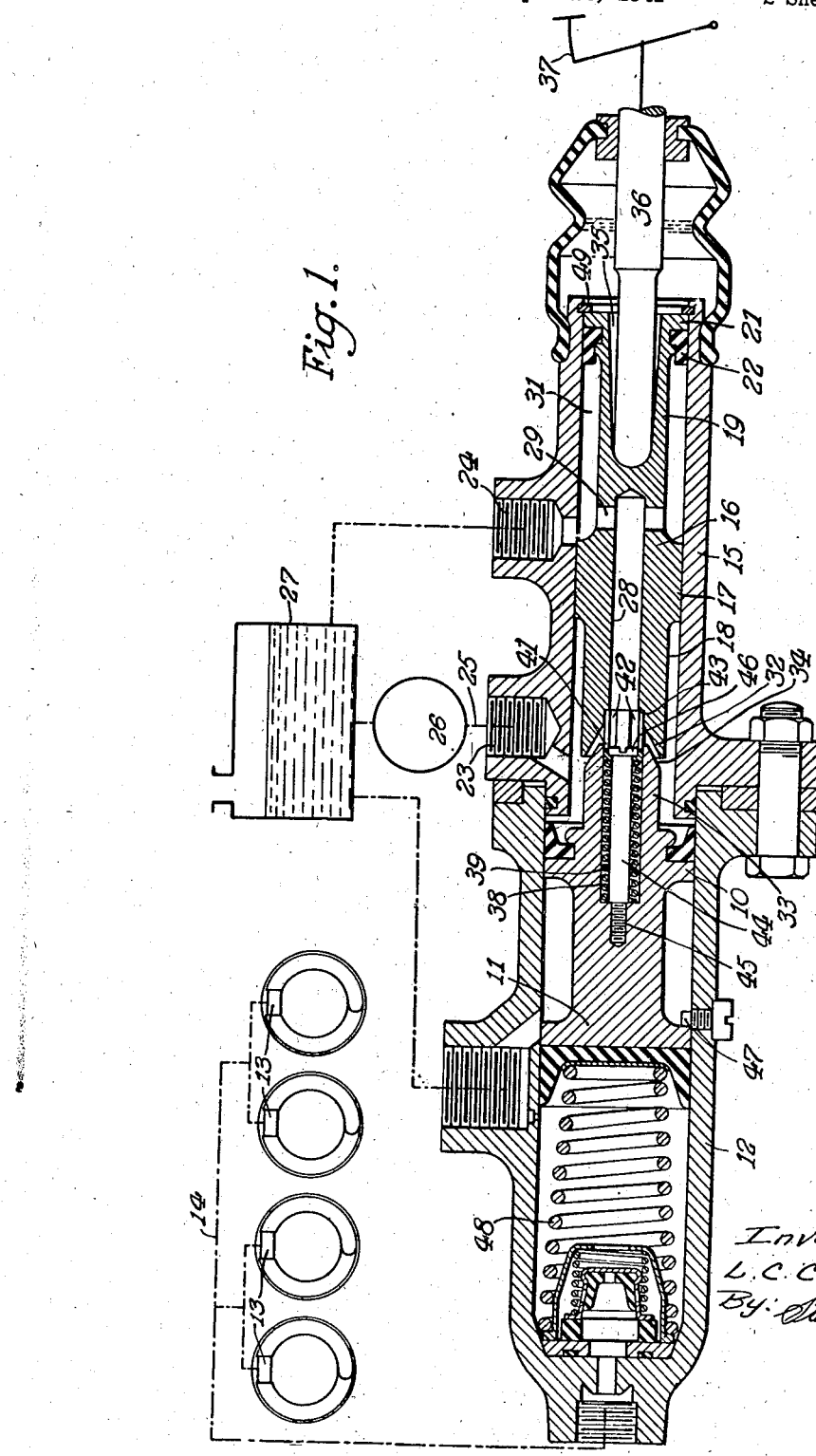

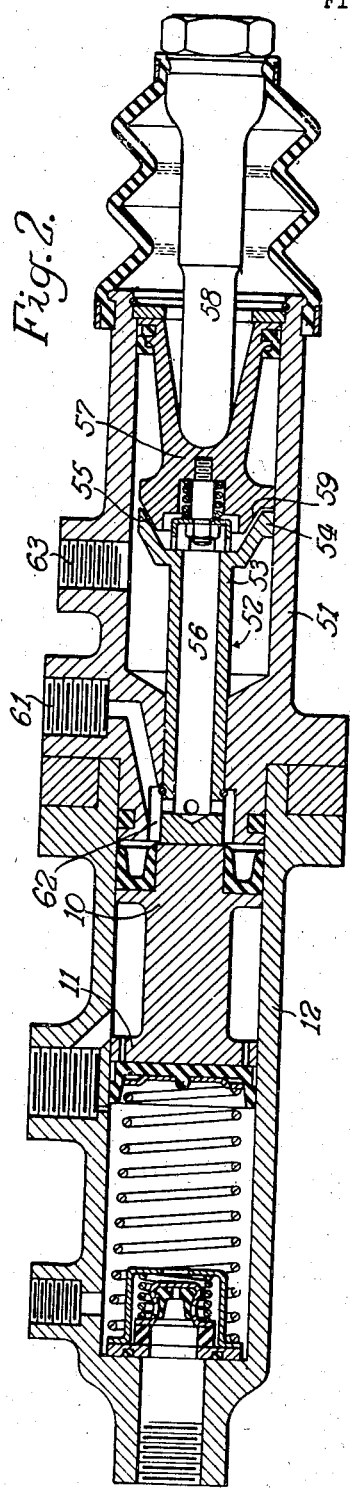
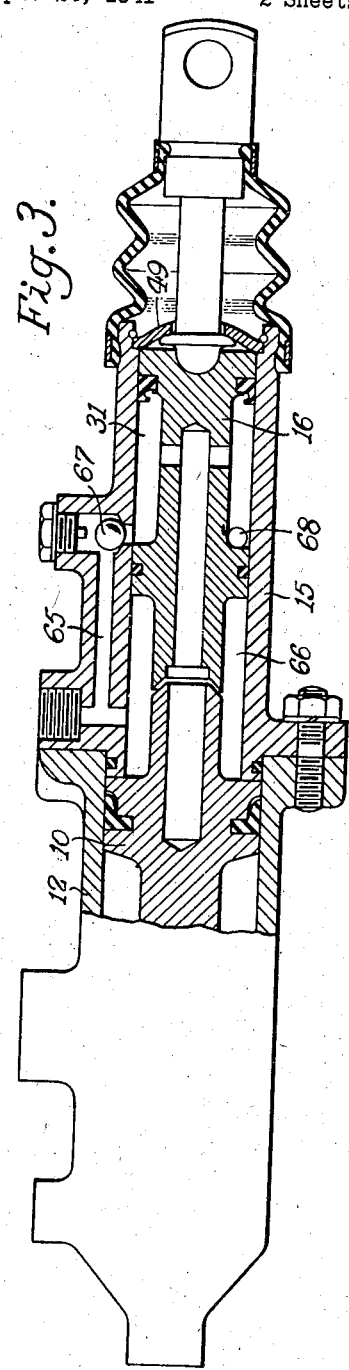

2,318,756

UNITED STATES PATENT OFFICE 2,318,756

BRAKE FOR VEHICLES

Leslie Cyril Chouings, Leamington Spa, England, assignor to Automotive Products Company Limited, Leamington Spa, England Application September 24, 1941, Serial No. 412,191
In Great Britain December 16, 1940

3 Claims. (Cl. 60—52)

This invention relates to brakes for vehicles and more specifically to brake operating mechanism of the kind comprising a liquid pressure actuated piston constituting a common operating member and coupled to the brakes on a plurality of wheels, a pedal or equivalent driver-operated control and a valve device operated by the pedal or equivalent to restrict the normally free circulation of liquid from a pump driven by the vehicle transmission and thereby to create liquid pressure to act on the common operating member and apply the brakes, the valve device being interposed between the pedal or equivalent and the piston so that pressure on the pedal or equivalent is adapted to be transmitted directly through the valve device to the piston, the valve being so arranged that it tends to re-open under the pressure of the liquid to limit such pressure in accordance with the pressure applied to the pedal or equivalent.

According to the present invention, a longitudinally apertured plunger co-axial with the piston and mounted in a housing is interposed between the piston and a thrust member connected to the pedal or equivalent, a port in the housing on the side of the plunger nearer the piston being connected to the pump and an outlet port being provided in the housing at the opposite side of the plunger and the aperture in the plunger is restricted by operation of the pedal or equivalent to apply thrust through the plunger to the piston, whereby pressure is built up to actuate the piston hydraulically.

According to another aspect of the invention, a longitudinally apertured plunger forms a movable transverse partition dividing into two chambers a housing co-axial with the piston, the aperture in the plunger being restricted by operation of the pedal or equivalent to apply thrust through the plunger to the piston, to restrict the flow of liquid delivered to the chamber adjacent the piston from that chamber to the chamber on the opposite side of the plunger and thereby to build up pressure to actuate the piston hydraulically.

The aperture in the plunger may be restricted by a closure member formed on a spigot integral with the piston, or by an auxiliary plunger interposed between the main plunger and the pedal-operated thrust member and the plunger may be formed with a countersunk recess at one end of the aperture therethrough to co-operate with a frusto-conical closure member. The plunger may have an intermediate portion which is a sliding fit in the bore of the housing, a rear end portion of equal diameter to the intermediate portion and separated therefrom by an annular recess, and a forwardly projecting portion also of smaller diameter than the intermediate portion. The aperture through the plunger may comprise an axial passage extending from the forward end thereof to a point beyond the intermediate portion where it is intersected by a diametral passage opening into the annular recess.

A connecting passage may be provided between the annular recess in the plunger and the space between the plunger and the piston, a non-return valve in said connecting passage being arranged to permit the flow of liquid from the annular recess but not in the opposite direction.

The invention is hereinafter described with reference to the accompanying drawings in which:

Figure 1 is a sectional elevation of a brake operating mechanism according to the invention, the other parts of the braking system being shown diagrammatically; and Figures 2 and 3 are sectional elevations of modified forms of brake operating mechanism according to the invention.

In the form of the invention shown in Figure 1, a piston 10 constituting the common operating member is formed integral with the piston 11 of a liquid pressure master cylinder 12 of known type, the said master cylinder 12 being connected to wheel cylinders 13 on the various brakes by means of piping 14. The pressure-receiving piston 10 is slidable in the rear end of the master cylinder 12. From the rear end of the master cylinder 12 there extends a co-axial cylinder 15 of smaller diameter attached in a fluid-tight manner to the master cylinder and in this cylinder 15 is slidably mounted a plunger 16 having an intermediate portion 17 which is a sliding fit in the cylinder and portions 18 and 19 of reduced diameter on each side of such intermediate portion, the rear end of the plunger, that is the end remote from the piston 10, being formed with a further enlarged portion 21 carrying a suitable packing ring 22 to make a fluid-tight joint in the cylinder 15. Two ports 23 and 24 in the wall of the cylinder 15 open one on each side of the intermediate enlarged portion 17 of the plunger 16, the ports 23 and 24 being spaced apart to a sufficient extent to allow the desired stroke of the plunger 16 without the intermediate enlarged portion of the plunger substantially overlapping either of them. The port 23 nearer to the piston 10 is connected by a pipeline 25 to the delivery outlet of a pump 26 driven from the transmission of the vehicle and the other port 24 is connected to the inlet of the pump or (as shown) to a reservoir 27 from which the pump draws liquid. An axial passage 28 is formed in the plunger 16 from its end near the piston 10 to a point beyond the intermediate enlarged portion 17, where it is intersected by a diametral passage 29 opening into the space 31 around the reduced portion 19 of the plunger. The open end of the axial passage 28 is flared or countersunk as at 32 to provide a valve seat and the piston 10 is formed with a valve 33 having a frusto-conical end 34 adapted to engage the valve seat 32 and close the passage through the plunger. The rear end of the plunger is deeply recessed at 35 to receive a push-rod 36 connected to a foot-pedal 37 operable by the driver of the vehicle. The valve 33 on the piston 10 is recessed axially to a considerable depth at 38 to receive a spring 39 acting to urge the piston 10 and plunger 16 apart. The spring 39 acts on a cup-shaped member 41 having its sides slotted to form axially extending fingers 42, the ends of which engage with an internal shoulder 43 at the inner edge of the valve seat 32 on the plunger 16 so that the spring tends to force the plunger away from the piston. A bolt 44 passing through the cup 41 and the spring 39 is screwed into a threaded bore 45 at the end of the recess in the piston, the head 46 of the bolt engaging the base of the cup to limit its movement out of the recess.

In the inoperative position of the parts, the piston unit 10, 11 is held against a stop 47 by the usual return spring 48 in the master cylinder 12 and the plunger 16 is in turn urged against a stop ring 49 in the rear end of the cylinder 15 by the spring 39. The liquid delivered by the pump 26 therefore flows between the conical end 34 of the valve and the valve face 32, through the slots in the cup-shaped member 41 and through the passages 28 and 29 in the plunger to the outlet port 24, no substantial restriction of its passage taking place so that the flow is substantially free and no pressure is built up. When the pedal 37 is depressed, the plunger 16 approaches the piston 10 and the flow of liquid between the plunger and valve is restricted, so that pressure is built up between the piston 10 and the intermediate enlarged portion 17 of the plunger 16. This pressure acts both to urge the piston 10 forwardly to apply the brakes and to urge the plunger 16 backwardly against the pressure on the pedal, but as the piston 10 has a larger area than the plunger 16 a greater total pressure is exerted on the former, a proportional but smaller reaction being transmitted through the plunger to the pedal. It will be evident that with any given pressure on the pedal 37 the liquid pressure will build up to a corresponding limit at which the valve is held open just sufficiently to permit liquid to escape at the same rate as it is delivered by the pump. The degree of braking obtained is thus completely under the control of the driver and the driver can "feel" the degree of braking applied. The removal of pressure from the brake pedal allows the plunger to return and permits the wide opening of the valve so that the liquid pressure is released and the piston 10 returns to its normal position, thus releasing the brakes. When the pump is not operating, the pedal pressure is transmitted directly through the plunger 16 to the piston 10, the frusto-conical face of the valve 33 on the piston 10 coming into engagement with the valve face 32 on the plunger 16 and the master cylinder is operated to apply the brakes, even if the pump has failed.

In the form of the invention shown in Figure 2 the piston 10 forming the common operating member is again integral with the piston 11 of a liquid pressure master cylinder 12 and the cylinder 51 in which the plunger 52 is mounted is reduced in internal diameter at its end adjacent the cylinder 12. The plunger 52 is in the form of a hollow stem 53 with a head 54 formed on its end remote from the piston 10, the stem 53 being a sliding fit in the reduced portion of the cylinder 51. The plunger head 54 is formed with a frusto-conical recess 55 into which the passage 56 through the stem opens, and an auxiliary plunger 57, arranged between the plunger head and a push rod 58 operated by the brake pedal, is formed with a frusto-conical projection 59 co-operating with the recess 55 to form a valve. Fluid from the pump enters the cylinder by a port 61 leading to a counterbored recess 62 at the end of the reduced portion of the cylinder 51 nearer to the piston 10 and the outlet port 63 is on the other side of the reduced portion, so that liquid flowing from one to the other must pass through passage 56 in the plunger and its flow can, therefore, be controlled by the valve. The end of the plunger stem 53 abuts the piston 10 to provide direct mechanical operation of the piston if the pump should not be delivering liquid.

The arrangement shown in Figure 3 closely resembles that shown in Figure 1, but the return spring 39 for the plunger 16 is omitted, the pressure of the liquid being relied upon to return the plunger into contact with its stop ring 49. A passage 65 connects the space 31 to the space 66 immediately behind the piston 10 and a non-return valve 67 in the passage 65 permits liquid to flow from the space 31 into the space 66 but not in the opposite direction. The space 31 is connected to the reservoir through a port 68.

If the brakes are applied suddenly, the plunger 16 and piston 10 may be moved forward so rapidly that the pump will not deliver sufficient fluid to keep the space 66 full, as this space is increasing in volume due to the difference in diameter between the cylinders 12 and 15. The provision of the passage 65 enables liquid to flow from the space 31 to keep the space 66 full and consequently the liquid pressure commences to build up on the piston 10 as soon as the rate of forward movement of the piston and plunger decreases sufficiently, instead of being delayed by the need for filling up the increased volume of the space 66.

The piston 10 may, in any of the above arrangements, be coupled to a thrust member operating the brakes through mechanical linkage instead of being coupled to a liquid pressure master cylinder.

What I claim is:

1. Brake operating mechanism for vehicles comprising brakes on at least some of the wheels of the vehicle, a common operating member for the brakes comprising a piston, a cylinder in which said piston is mounted, driver operated thrust means for moving said piston to apply the brakes, a housing fixed to and co-axial with said cylinder and formed with a bore of uniform cross-section, a plunger in said housing having an intermediate portion which is a sliding fit in said bore, a rear end portion of equal diameter to the intermediate portion, a reduced portion forming an annular recess between the two portions fitting in the bore, and a forwardly projecting reduced portion, a pump driven from the vehicle transmission, a connection from said pump to the housing forward of the intermediate portion of the plunger, a reservoir, a connection from said reservoir to the annular recess around the plunger, a passage through said plunger connecting the spaces surrounding the two reduced portions of the plunger, a seat in said passage, and a valve member integral with said piston adapted to approach said seat when the thrust member is operated to apply thrust to the piston and thereby to build up pressure to act on said piston and apply the brakes, the presssure so built up acting on the piston and plunger in opposite directions so as to tend to separate them and relieve the pressure.

2. Brake operating mechanism for vehicles comprising, brakes on at least some of the wheels of the vehicle, a common operating member for the said brakes comprising a piston, a cylinder in which said piston is mounted, driver operated thrust means for moving said piston to apply the brakes, a housing fixed to and co-axial with said cylinder, a uniform bore through said housing, a plunger in said housing and interposed between said piston and said thrust means, an annular recess formed by a reduced portion of the plunger adjacent the rear end thereof, a pump driven from the vehicle transmission, a connection from the pump to said housing in front of the plunger, a reservoir, a connection from said reservoir to the annular recess, an axial passage in said plunger extending from the forward end thereof to the recessed part of the plunger, a diametral passage connecting said axial passage to the annular recess, a seat at the forward end of the passage, and a valve member integral with the piston adapted at times to engage said seat to build up pressure to act on the piston and apply the brakes.

3. Brake operating mechanism, according to claim 2, wherein a passage other than the passage through the plunger controlled by the valve member is provided between the pump connection and the reservoir connection to the housing, and a non-return valve is provided in said passage to permit flow of liquid only from said reservoir connection to said pump connection.

LESLIE CYRIL CHOUINGS.